US008497662B2

(12) United States Patent
Aradachi et al.

(10) Patent No.: US 8,497,662 B2
(45) Date of Patent: Jul. 30, 2013

(54) CHARGING DEVICE

(75) Inventors: Takao Aradachi, Hitachinaka (JP); Kazuhiko Funabashi, Hitachinaka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 521 days.

(21) Appl. No.: 12/257,421

(22) Filed: Oct. 24, 2008

(65) Prior Publication Data

US 2009/0108804 A1 Apr. 30, 2009

(30) Foreign Application Priority Data

Oct. 25, 2007 (JP) ................................ P2007-277042

(51) Int. Cl.
*H02J 7/00* (2006.01)
(52) U.S. Cl.
USPC ........... 320/124; 320/125; 320/126; 320/128; 320/106
(58) Field of Classification Search
USPC ........................... 320/124, 125, 126, 128, 106
See application file for complete search history.

(56) References Cited

U.S. PATENT DOCUMENTS

| 4,849,682 | A | * | 7/1989 | Bauer et al. ..................... 320/106 |
| 5,028,860 | A | | 7/1991 | Amano |
| 5,065,082 | A | * | 11/1991 | Fushiya ........................ 320/110 |
| 5,187,422 | A | * | 2/1993 | Izenbaard et al. ............ 320/110 |
| 5,237,257 | A | | 8/1993 | Johnson |
| 5,734,253 | A | * | 3/1998 | Brake et al. ..................... 320/125 |
| 5,744,937 | A | * | 4/1998 | Cheon ............................. 320/125 |
| 5,939,856 | A | * | 8/1999 | Demuro et al. ................. 320/106 |
| 6,459,237 | B1 | | 10/2002 | Bausch |
| 6,992,464 | B2 | * | 1/2006 | Takano et al. ................. 320/150 |
| 7,619,389 | B2 | | 11/2009 | Wanibuchi |
| 2005/0077878 | A1 | | 4/2005 | Carrier et al. |
| 2006/0028178 | A1 | * | 2/2006 | Hobbs ............................ 320/128 |
| 2007/0103113 | A1 | | 5/2007 | Embrey et al. |
| 2007/0103121 | A1 | | 5/2007 | Johnson et al. |
| 2008/0309286 | A1 | * | 12/2008 | Hoff ............................... 320/107 |

FOREIGN PATENT DOCUMENTS

| JP | 02-192670 | 7/1990 |
| JP | 2-299428 | 12/1990 |
| JP | 5-251112 | 9/1993 |
| JP | 7-87685 | 3/1995 |
| JP | 8-233919 | 9/1996 |
| JP | 8-304518 | 11/1996 |
| JP | 10-215523 | 8/1998 |
| JP | 11-191932 | 7/1999 |

(Continued)

*Primary Examiner* — Samuel Berhanu
(74) *Attorney, Agent, or Firm* — Antonelli, Terry, Stout & Kraus, LLP.

(57) ABSTRACT

A charging device has a charging unit and a control unit. The charging unit charges a battery pack the battery pack being either a first type or a second type of battery pack. The first type of battery pack includes a single battery cell or a first plurality of battery cells connected in series. The second type of battery pack includes a single battery unit or a second plurality of battery units connected in series. Each battery unit includes at least two battery cells connected in parallel. The control unit controls the charging unit to control at least one of a charging current flowing through the battery pack and a charging voltage applied across the battery pack, depending on the battery pack to be charged.

11 Claims, 4 Drawing Sheets

FOREIGN PATENT DOCUMENTS

| | | |
|---|---|---|
| JP | 2000-350376 | 12/2000 |
| JP | 2001-283934 | 10/2001 |
| JP | 2001283934 A * | 10/2001 |
| JP | 2002-44878 | 2/2002 |
| JP | 2005-73434 | 3/2005 |
| JP | 2006-304548 | 11/2006 |

* cited by examiner

FIG.4

| TYPE OF BATTERY PACK | CHARGING CURRENT (CONSTANT CURRENT) | CHARGING VOLTAGE (CONSTANT VOLTAGE) |
|---|---|---|
| 1P TYPE | 5.0 A/cell | 4.15 V/cell |
| 2P TYPE | 5.0 A/cell | 4.15 V/cell |

FIG.5

| TYPE OF BATTERY PACK | CHARGING CURRENT (CONSTANT CURRENT) | CHARGING VOLTAGE (CONSTANT VOLTAGE) |
|---|---|---|
| 1P TYPE | 5.0 A/cell | 4.10 V/cell |
| 2P TYPE | 5.0 A/cell | 4.15 V/cell |

FIG.6

| TYPE OF BATTERY PACK | CHARGING CURRENT (CONSTANT CURRENT) | CHARGING VOLTAGE (CONSTANT VOLTAGE) |
|---|---|---|
| 1P TYPE | 5.0 A/cell | 4.10 V/cell |
| 2P TYPE | 2.5 A/cell | 4.15 V/cell |

CHARGING DEVICE

CROSS REFERENCE TO RELATED APPLICATIONS

This application claims priority from Japanese Patent Application No. 2007-277042 filed Oct. 25, 2007. The entire content of the priority application is incorporated herein by reference.

TECHNICAL FIELD

The present invention relates to a charging device for charging a secondary battery such as a lithium ion secondary battery.

BACKGROUND

In general, a cordless electric tool uses a secondary battery pack that is rechargeable with a charging device as a power supply. A lithium ion (Li-ion) battery cell is commonly used to form the secondary battery pack. A charging device for a Li-ion type battery pack generally charges the battery pack with a constant charging current and at a constant charging voltage. In particular, in order to avoid reverse charging for each battery cell, the charging device charges the battery pack with the constant charging current until the battery voltage reaches a predetermined value, and then charges at the constant charging voltage until the current passing through the battery pack reduces under a predetermined value due to full charging.

There are two types of battery pack to be charged by the charging device: a first type of battery pack and a second type of battery pack. The first type of battery pack is a 4S1P type of battery pack having a nominal voltage of 14.4 V, in which four battery cells are connected in series. The second type of battery pack is a 4S2P type of battery pack having a nominal voltage of 14.4 V, in which a pair of battery cells is connected in parallel and four pairs of parallel-connected battery cells are connected in series.

If one charging device selectively charges the above two different types of battery packs and flows the same amount of charging current through each battery pack, the amount of current passing through each cell of the 4S1P type is twice as much as the amount of current passing through each cell of the 4S2P type. This phenomenon may result in shortening the lifespan of the 4S1P type, compared with the lifespan of the 4S2P type.

The charging voltage also influences the lifespan of the battery pack. If each battery cell is charged at a lower charging voltage, the lifespan of the battery pack is expected to be extended.

Further, an amount of discharging current from each cell of the 4S1P type is generally more than an amount of discharging current from each cell of the 4S2P type. Even if each type of battery pack is charged at the same voltage, the lifespan of the 4S1P type is shorter than the lifespan of the 4S2P type because of an amount of discharging current per cell.

An object of the present invention is to provide a charging device which charges a battery pack with a proper current and at a proper voltage depending on the type of battery pack to avoid affecting the lifespan of the battery pack.

SUMMARY

The present invention provides a charging device having a charging unit and a control unit. The charging unit charges a battery pack the battery pack being either a first type or a second type of battery pack. The first type of battery pack includes a single battery cell or a first plurality of battery cells connected in series. The second type of battery pack includes a single battery unit or a second plurality of battery units connected in series. Each battery unit includes at least two battery cells connected in parallel. The control unit controls the charging unit to control at least one of a charging current flowing through the battery pack and a charging voltage applied across the battery pack, depending on the battery pack to be charged.

BRIEF DESCRIPTION OF THE DRAWINGS

The particular features and advantages of the invention as well as other objects will become apparent from the following description taken in connection with the accompanying drawings, in which:

FIG. 4 is a table showing one example charging a 1P type of battery pack and a 2P type of battery pack with the same charging current and the same charging voltage;

FIG. 5 is a table showing one example charging a 1P type of battery pack and a 2P type of battery pack, in which a charging voltage for a 1P type is less than a charging voltage for a 2P type;

FIG. 6 is a table showing one example charging a 1P type of battery pack and a 2P type of battery pack, in which a charging current passing through each battery cell in a 1P type is more than a charging current passing through each battery cell in a 2P type and a charging voltage for a 1P type is less than that for a 2P type.

DETAILED DESCRIPTION

Figure 1:
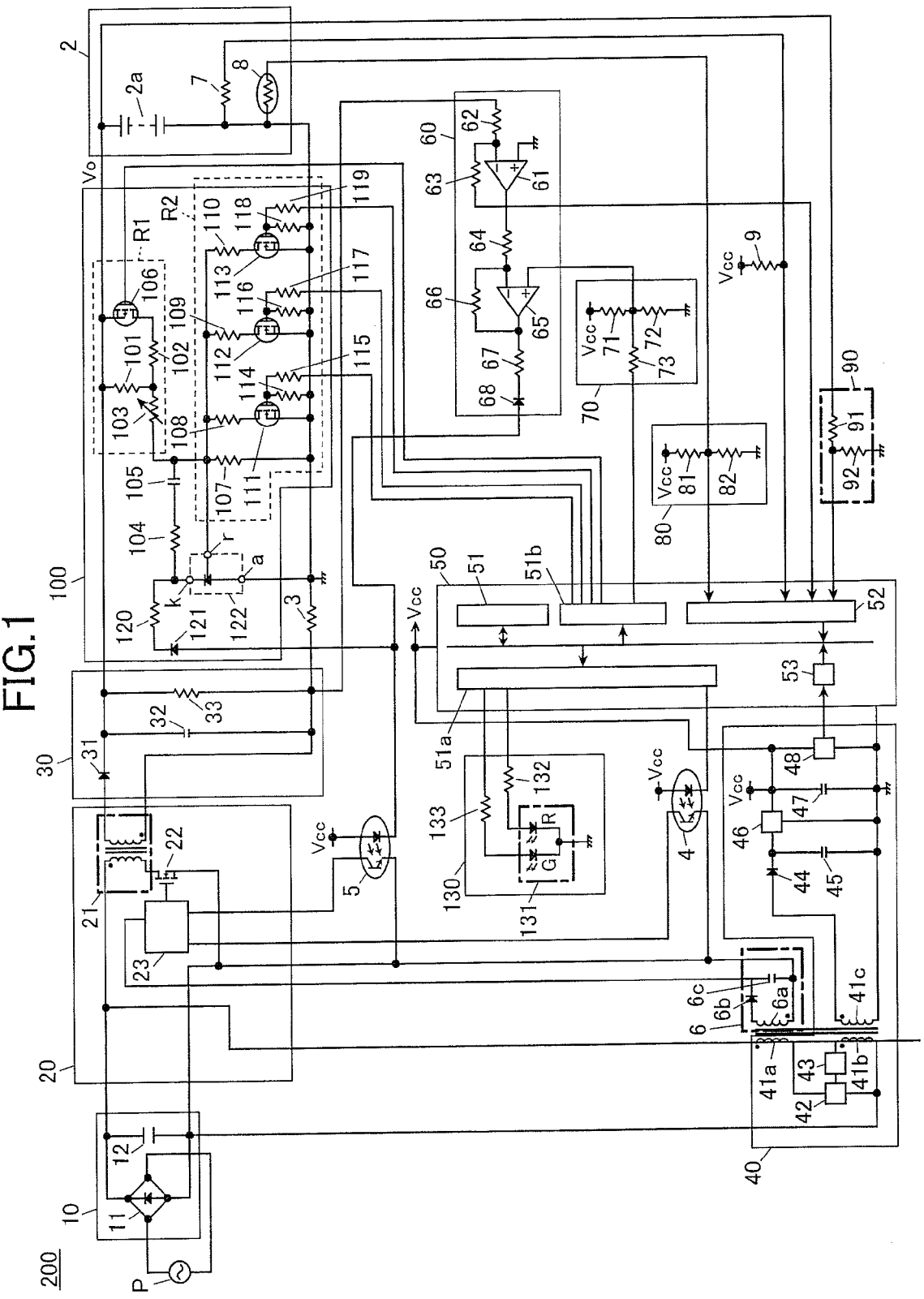
FIG. 1 shows a circuit diagram of a charging device according to an embodiment of the present invention.
Figure 2:
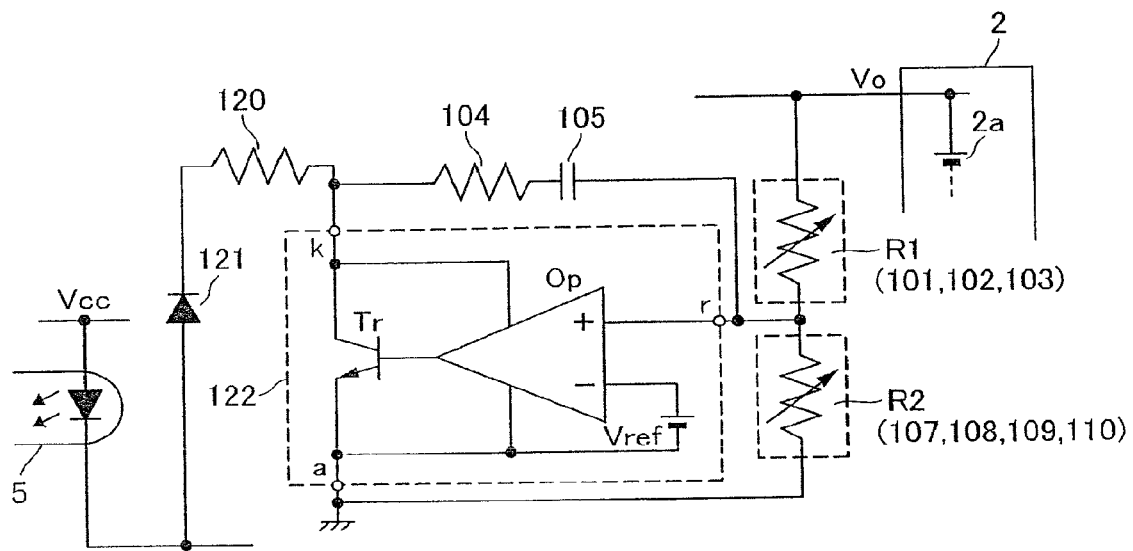
FIG. 2 shows a circuit diagram of an equivalent circuit of a shunt regulator in the charging device shown in FIG. 1.

The next description will explain a charging device 200 according to an embodiment of the present invention, referring to FIGS. 1 and 2. FIG. 1 shows a circuit diagram of the charging device 200 for charging a battery pack 2 with power supplied from an alternating-current power supply P.

The charging device 200 charges any one of different types of battery packs 2. In this embodiment, the charging device 200 charges a first type of battery pack 2 and a second type of battery pack 2, which has a different configuration of battery cells 2a. In this embodiment, the configuration of battery cells 2a means the number of battery cells and a connection manner of the battery cells in the battery pack: series-connection or parallel-connection, how many cells are connected in series, and how many cells are connected in parallel. Each of the first and second types of battery cells 2a includes a single battery cell 2a or a plurality of battery cells 2a and has a positive terminal and a negative terminal. The battery cells 2a is made from a lithium ion (Li-ion) secondary cell.

The first type of battery pack, as illustrated in FIGS. 1 and 2, includes a single battery cell 2a or a plurality of battery cells 2a connected in series in a single row, so called, a 1P type of battery pack. One example is a 4S1P battery pack having a nominal voltage of 14.4 V. The 4S1P battery pack includes four battery cells 2a connected in series.

Figure 7:
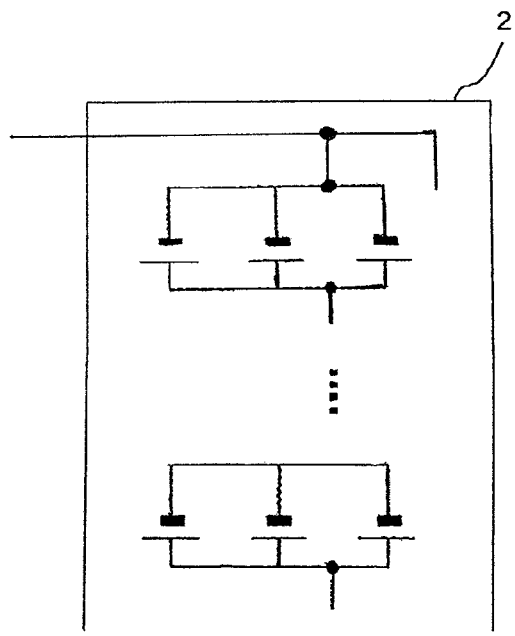
FIG. 7 shows an arrangement of battery cells for a 2P type of battery pack.
Figure 3:
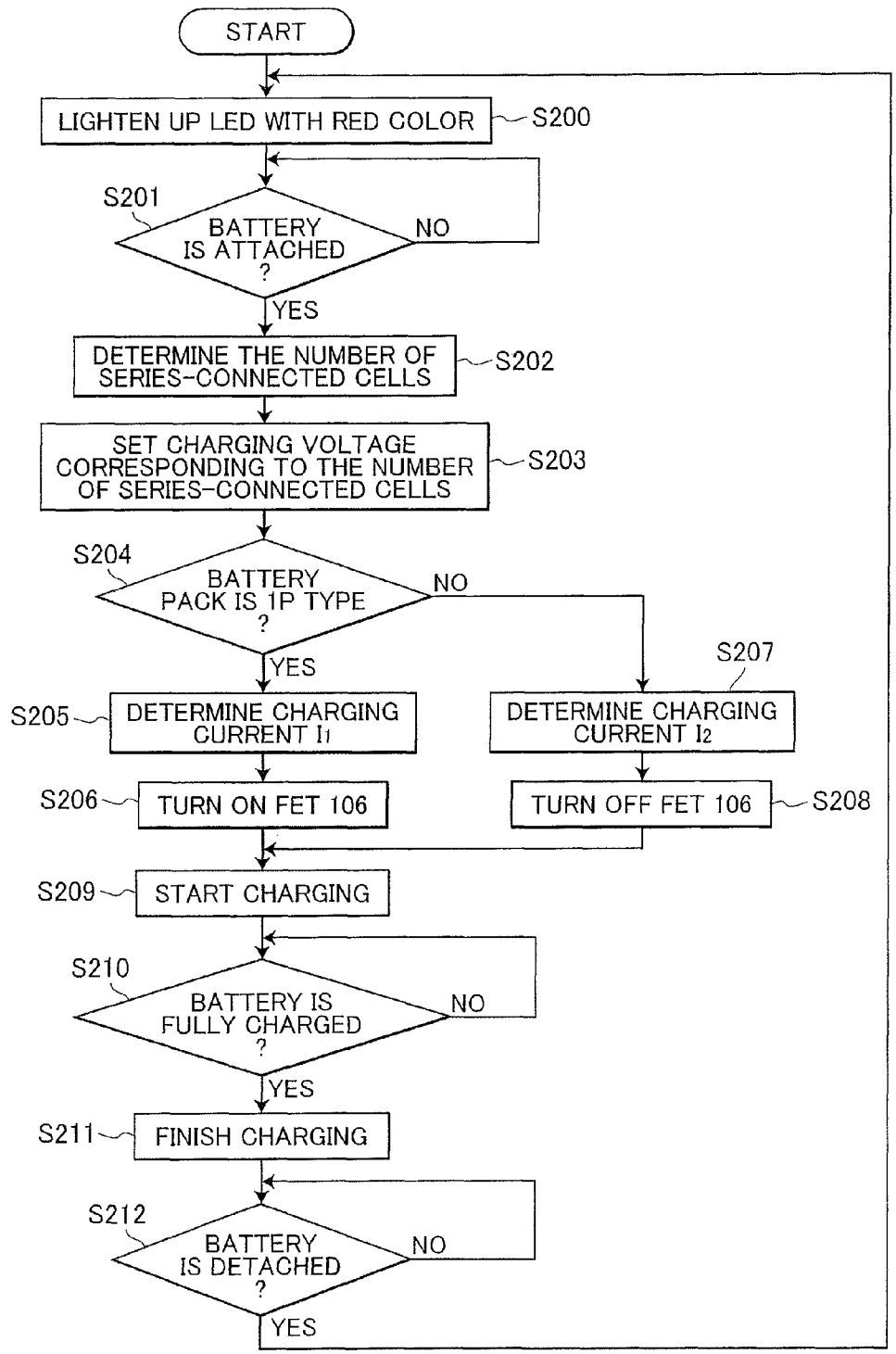
FIG. 3 shows a flowchart illustrating a process for charging a battery pack with the charging device shown in FIG. 1.

The second type of battery pack, as illustrated in FIG. 7, includes a single battery unit or a plurality of battery units connected in series in a single row, each battery unit including at least two battery cells 2a connected in parallel. The second type of battery pack is so called a 2P type of battery pack. One example is a 4S2P battery pack having has a nominal voltage of 14.4 V and having eight battery cells 2a, in which two battery cells 2a are connected in parallel to form one battery unit and four battery unit are connected in series. The second type of battery pack 2 may have more than two battery cells 2a connected in parallel in each battery unit. Described above, the second type of battery pack includes a plural-P type of battery pack (plural being an integer more than 1). For example, a 4S3P battery pack has twelve battery cells 2a in which three battery cells 2a are connected in parallel to form one battery unit and four battery units are connected in series.

The battery pack 2 further includes an identifier 7 and a thermosensor 8. The identifier 7 represents a configuration of the battery cells 2a in the battery pack 2. In particular, the identifier 7 represents the number of battery cells 2a and their connecting configuration such as series-connection and/or parallel connection in the battery pack 2. The identifier 7 includes a battery identifying resistor 7 having a resistance value depending on the configuration of the battery cells 2a in the battery pack 2. For example, a 2S2P battery pack includes a resistor having a value of Ra. A 2S1P, 3S2P, 3S1P, 4S2P, 4S1P, 5S2P, and 5S1P battery pack includes a resistor having a resistance value of Rb, Rc, Rd, Re, Rf, Rg, and Rh, respectively.

The thermosensor 8 is a thermistor provided close to or on the battery cell 2a to detect a temperature in the battery pack 2.

The charging device 1 is provided with a current detection unit 3, a charging control signal transmission unit 4, a charging current signal transmission unit 5, a rectification smoothing circuit 6, a second battery type determination resistor 9, a rectification smoothing circuit 10, a switching circuit 20, a rectification smoothing circuit 30, a power supply 40, a microcomputer 50, a charging current control circuit 60, a charging current setting unit 70, a battery temperature detection unit 80, a battery voltage detection unit 90, a charging voltage control unit 100, and a display unit 130.

The current detection unit 3 is a resistor, and detects a voltage applied across the resistor in order to obtain a charging current flowing through the battery pack 2.

The rectification smoothing circuit 10 includes a full-wave rectifier circuit 11 and a smoothing capacitor 12. The full-wave rectifier circuit 11 rectifies the alternating-current supplied from the alternating-current power supply P, and the smoothing capacitor 12 smoothes the direct-current outputted from the full-wave rectifier circuit 11.

The switching circuit 20 includes a high-frequency transformer 21 having a primary winding and a secondary winding, a MOSFET (switching element) 22 connected with the primary winding in series, and the PWM control IC (switching control IC) 23.

A driving power for the PWM control IC 23 is supplied from the rectification smoothing circuit (direct current power source) 6. The rectification smoothing circuit 6 includes a transformer 6a, a rectifier diode 6b, and a smoothing capacitor 6c, and passes the power from the power supply 40 to the PWM control IC 23. The PWM control IC 23 receives a charging voltage control signal and a charging current control signal through the charging current signal transmission unit 5, which is a photocoupler, from the charging current control circuit 60. The PWM control IC 23 receives a start signal and a stop signal for controlling start and stop of charging the battery pack 2 through the charging control signal transmission unit 4, which is a photocoupler, from the microcomputer 50. The PWM control IC 23 changes the drive pulse width applied to the gate of the MOSFET 22 in order to adjust an output voltage outputted to the rectification smoothing circuit 30 and a charging current passing through the battery pack 2.

The rectification smoothing circuit 30 includes a diode 31 connected with the secondary winding of the transformer 21, a smoothing capacitor 32, and a discharging resistor 33. The diode 31 rectifies the alternating-current supplied from the switching circuit 20, and the smoothing capacitor 32 smoothes the direct-current outputted from the diode 31.

The determination resistor 9 divides a reference voltage (stabilized direct voltage) Vcc together with the identifier 7. The divided voltage is outputted as cell configuration information indicating the number of the battery cells 2a and their configuration in the battery pack 2.

The power supply 40 includes transformers 41a to 41c, a switching element 42, a control element 43, a rectifier diode 44, a three-terminal regulator 46, a smoothing capacitor 45 connected to an input terminal of the regulator 46, a smoothing capacitor 47 connected to an output terminal of the regulator 46, and the reset IC 48, and supplies power to the microcomputer 50 and the rectification smoothing circuit 6. The reset IC 48 outputs a reset signal to the microcomputer 50 through the reset port 53 when the commercial power source P supplies power to the charging device 200.

The microcomputer 50 includes output ports 51a and 51b, an A/D input port 52, and a reset port 53. The microcomputer 50 further includes a central processing unit (CPU) 51, a read-only-memory (ROM) for storing control programs for the CPU 51 and data associated with the types of battery packs 2, a random-access memory (RAM) used for a working area for the CPU 51 and a temporary storage area for the data, and a timer. The cell configuration information outputted from the determination resistor 9, the battery temperature information outputted from the battery temperature detection unit 80, the battery voltage information outputted from the battery voltage detection unit 90, and the voltage detected by the current detection unit 3 are inputted into the A/D port 52. Accordingly, the microcomputer 50 determines the battery temperature and the battery voltage. The microcomputer 50 generates control signals to the power supply 40 and the charging current control circuit 60, and outputs control signals to the charging control signal transmission unit 4 and the display unit 130, and a charging state signal from the output port 51a.

the microcomputer 50 determinates the configuration and the number of the series-connected cells of the battery pack 2 based on the cell configuration information, and outputs a charging voltage control signal corresponding to the number of the series-connected cells from the output port 51b to the charging voltage control unit 100. The microcomputer 50 outputs a charging current control signal based on the cell configuration information to the charging current setting unit 70. The reset port 53 receives a reset signal from the reset IC 48.

The charging current control circuit 60 includes an operational amplifier circuit having operational amplifiers (op-amps) 61 and 65, input resistors 62 and 64 and feedback resistors 63 and 66 for the op-amps 61 and 65, a diode 68, and current limiting resistor 67. An inverting terminal of the op-amp 61 is connected to the current detection unit 3. A non-inverting terminal of the op-amp 65 is connected to the charging current setting unit 70. An output terminal of the charging current control circuit 60 is connected to the PWM control IC 23 through the charging current signal transmission unit 5.

The charging current control circuit 60 outputs the current control signal based on both the charging current (the voltage) detected by the current detection unit 3 and the reference value outputted from the charging current setting unit 70. An output terminal of the op-amp 61 is connected to the A/D converter 52 in order to monitor the charging current, so that the microcomputer 50 determines a reduction of the charging current when the battery pack 2 is fully charged.

The charging current setting unit 70 sets an amount of charging current passing through the battery pack 2, depending on the type of the battery pack 2. The charging current setting unit 70 includes resistors 71 and 72 connected in series between the reference voltage Vcc and a ground. The charging current setting unit 70 further includes a resistor 73 which may be connected with the resistor 72 in parallel. The reference voltage Vcc is divided by the resistors 71 and 72, and the divided voltage is outputted as a reference value for setting the charging current. The resistor 73 is connected with the with the resistor 72 in parallel, depending on the type of the battery pack 2, so that the charging current setting unit 7 changes the amount of charging current.

For example, if the microcomputer 50 controls that the resistor 73 is selected as being connected to the resistor 72 in parallel and the resistor 71 is connected with the parallel-connected resistors 72 and 73, the microcomputer 50 sets a first charging current $I_1$ passing through the battery pack 2. If the microcomputer 50 controls that only the resistor 72 is selected as being connected with the resistor 71 in series, the microcomputer 50 sets a second charging current $I_2$ passing through the battery pack 2. In this case, the microcomputer 50 sets the amount of the first charging current less than the amount of the second charging current.

In the charging current control circuit 60, the resistors 62 and 63 and the op-amp 61 invert and amplify the voltage across the current detection unit 3. The op-amp 65 amplifies the difference between the output of the op-amp 61 and the setting voltage corresponding to the charging current value set by charging current setting unit 70. The output of the charging current control circuit 60 is supplied to the PWM control IC 23 through the charging current signal transmission unit 5 to control the switching operation of the MOSFET 22. In other words, the current detection unit 3, the charging current control circuit 60, the charging current signal transmission unit 5, the switching circuit 20, and the rectification smoothing circuit 30 adjust the actual charging current passing through the battery pack 2 to the charging current set by the charging current setting unit 70.

The battery temperature detection unit 80 includes resistors 81 and 82 connected in series between the reference voltage Vcc and the ground (voltage divider circuit). The reference voltage Vcc is divided by the thermosensor 8 and the resistors 81 and 82. The divided voltage representing a temperature change in the resistance of the thermosensor 8 is outputted as battery temperature information to an A/D convertor 52 of the microcomputer 50.

The battery voltage detection unit 90 includes resistors 91 and 92, and is connected with the positive terminal of the battery pack 2. The battery voltage is divided by the resistors 91 and 92, and the divided voltage is outputted as battery voltage information to the A/D convertor 52 of the microcomputer 50.

The charging voltage control unit 100 controls the charging voltage applied to the battery pack 2, and includes a shunt regulator 122, a first resistance setting circuit R1, and a second resistance setting circuit R2. The shunt regulator 122 is a well-known type of shunt regulator and has an anode terminal a, a cathode terminal k, and a reference terminal r. The first resistance setting circuit R1 and the second resistance setting circuit R2 are connected to the reference terminal r of the shunt regulator 122. FIG. 2 shows an equivalent circuit of the shunt regulator 122 having an operational amplifier (voltage comparator) Op, a current path transistor Tr, and a reference voltage source Vref including as a zener diode.

The first resistance setting circuit R1 is connected between the positive terminal of the battery pack 2 and the reference terminal (comparison input terminal) r of the shunt regulator 122, and includes resistors 101, 102, and 103. The second resistance setting circuit R2 is connected between the negative terminal of the battery pack 2 and the reference terminal r of the shunt regulator 122, and includes resistors 107, 108, 109, and 110. The cathode terminal k of the shunt regulator 122 is connected with a current limiting resistor 120 and a diode 121 which are connected in series. A series-connected phase compensation resistor 104 and capacitor 105 is connected between the reference terminal r and the cathode terminal k of the shunt regulator 122.

Provided that the first combined resistance of the first resistance setting circuit R1 is r1, the second combined resistance of the second resistance setting circuit R2 is r2, and an internal reference voltage of the shunt regulator 122 is Vref, for example, 2.5V, the output charging voltage Vo adjusted by the shunt regulator 122 becomes approximately Vref*(1+r1/r2). Accordingly, a mode for the charging voltage Vo can be changed if a divided ratio r1/r2 is changed.

In this embodiment, the mode for the charging voltage Vo is switched by changing the first combined resistance r1. If the first combined resistance r1 is changed, at least two charging voltage modes: a first voltage charging mode in which the charging voltage is relatively higher, and a second charging voltage mode in which the charging voltage is lower than that of the first charging voltage mode are s selectable.

In order to switch the above charging voltage modes, the resistor 102 is connected to a switching element (p-channel MOSFET) 106 in series. The resistor 102 is electrically connected with the resistor 101 in parallel when the switching element 106 is turned on. With this structure, if the first charging voltage mode is selected to generate the charging voltage Vo, the switching element 106 is turned off, and only the resistor 101 is selected as the combined resistance r1. If the second charging voltage mode is selected, the switching element 106 is turned on, so that the resistor 102 is electrically connected with the resistor 101 in parallel to provide the combined resistance r1. In this embodiment, the first charging voltage mode is selected for the 2P type of battery pack, and the second charging voltage mode is selected for the 1P type of battery pack. For example, the charging voltage of 4.15 V/cell is set for the 2P type of battery pack in the first charging voltage mode, and the charging voltage of 4.10 V/cell is set for the 1P type of battery pack in the second charging voltage mode.

The second combined resistance r2 is changed in order to adjust the charging voltage depending on the number of series-connected battery cells 2a of the battery pack 2 to be charged. If the number of series-connected battery cells is plural and the total charging voltage applied across the battery pack 2 is set higher, the series-connected resistor 108 and switching element (n-channel MOSFET) 111 is connected with the resistor 107 in parallel. Similarly, the series-connected resistor 109 and switching element (n-channel MOSFET) 112 is connected with the resistor 107 in parallel. The series-connected resistor 110 and switching element (n-channel MOSFET) 113 is connected with the resistor 107 in parallel. The gates of the switching elements 111, 112, and 113 are connected to the output port 51b through the resistors 115, 117, and 119, respectively. The biasing resistors 114, 116, and 118 are connected between the corresponding gate of the switching elements 111, 112, and 113 and the ground, respectively.

Each of switching elements 111, 112, and 113 is selectively controlled by the control signal from the microcomputer 50, depending on the number of series-connected battery cells 2a in the battery pack 2 to be charged. In this embodiment, the number of series-connected battery cells 2a means the number of series-connected battery cells in the 1P type of battery pack, and the number of series-connected battery units in the plural-P type of battery pack.

When the microcomputer 50 determines that the number of series-connected battery cells are two, the microcomputer 50 does not output the charging voltage control signal from the output port 51b to any of the gate terminals of the FETs 111, 112 and 113 to turn on the FETs 111, 112 and 113. Thus, a voltage divided by a series resistance of the first combined resistance r1 and the resistor 107 is inputted into the reference terminal r of the potentiometer 103 to set a charging voltage corresponding to the two cells connected in series.

When the microcomputer 50 determines that the number of series-connected battery cells are three, the microcomputer 50 outputs the charging voltage control signal from the output port 51b to turn on the FET 111, and then the combined resistance r2 is provided with the parallel-connected resistors 108 and 107. Thus, a voltage divided by the series resistance of first combined resistance r1 and the parallel-connected resistance of the resistors 107 and 108 is inputted into the reference terminal r to set a charging voltage corresponding to the three cells connected in series.

When the microcomputer 50 determines that the number of series-connected battery cells are four, the microcomputer 50 outputs the charging voltage control signal from the output port 51b to turn on the FET 112, and the combined resistance r2 is provided with the parallel-connected resistors 109 and 107. Thus, a voltage divided by the series resistance of the first combined resistance r1 and a parallel-connected resistance of the resistors 107 and 109 is inputted into the reference terminal r to set a charging voltage corresponding to the four cells connected in series.

When the microcomputer 50 determines that the number of series-connected battery cells are five, the microcomputer 50 outputs the charging voltage control signal from the output port 51b to turn on the FET 113, and the combined resistance r2 is provided with the parallel-connected resistors 110 and 107. Thus, a voltage divided by the series resistance of the first combined resistance r1 and a parallel-connected resistance of the resistor 107 and 110 is inputted into the reference terminal r to set a charging voltage corresponding to the five cells.

If the battery pack 2 includes a single battery cell 2a or at least two battery cells connected in parallel, the second resistance setting circuit R2 may have the corresponding combined resistance r2 by changing the resistance of the resistor 107 without operationally connecting any other resistors 108, 109, or 110 into the second resistance setting circuit R2.

The display unit 130 indicates the charging state of the battery pack 2, and includes an LED 131, resistors 132 and 133. The LED 131 includes a green diode G and a red diode R. When the charging state signal outputted from the output port 51a is inputted into the red diode R via the resistor 132, the red diode R lights up with red color, and indicates that the battery pack 2 is prior to charging. When the charging state signal is inputted into the green diode G via the resistor 133, the green diode G lights up with green color, and indicates that the charging battery pack 2 is completed. Furthermore, when the charging state signal are inputted into both the green diode G via the resistor 133 and the red diode R via the resistor 132 concurrently, the LED 131 lights up with orange color, and indicates that the battery pack 2 is in a process for charging. In this embodiment, the LED 131 lights up with the red color before charging, with the orange color during charging, and with the green color after charging.

The next description will be made for explaining charging the charging device 200. FIG. 2 shows a flowchart illustrating a control for charging the battery pack 2.

Generally, the charging device 200 (the microcomputer 50) charges the battery back 2 with a constant charging current until the battery voltage reaches a predetermined voltage, and at a constant charging voltage after the battery voltage has reached the predetermined voltage.

Before the battery pack 2 is attached to the charging device 200, the microcomputer 50 outputs a high signal (the reference voltage Vcc) as the charging state signal from the output port 51a to the LED 131 via the resistor 132 so that the LED 121 lights up with the red color (step 200).

Next, the microcomputer 50 determines whether or not the battery pack 2 is attached to the charging device 200 in response to the input from the battery temperature detection unit 80, the determination resistor 9, and the battery voltage detection unit 90 (step 201).

If the battery pack 2 is attached (step 201: YES), the microcomputer 50 determines the configuration of cells based on the cell configuration information inputted by the determination resistor 9 (step 202). First, the microcomputer 50 determines the number of battery cells 2a connected in series in the battery pack 2, according to the resistance of the battery identifying resistor 7 in step 202. The microcomputer 50 then sets a charging voltage corresponding to the configuration of the cells determined in step 202 (step 203).

In this embodiment, the charging device 200 charges the Li-ion battery pack including the number of series-connected battery cells 2a which is any one of two, three, four, and five. In other words, if the number of series-connected battery cells 2a is three, the switching elements 111 is turned on and the charging voltage for three battery cells connected in series in the battery pack 2 is set. If the number of series-connected battery cells 2a is four, the switching elements 112 is turned on and the charging voltage for four battery cells connected in series in the battery pack 2 is set. If the number of series-connected battery cells 2a is five, the switching elements 113 is turned on and the charging voltage for five battery cells connected in series in the battery pack 2 is set. If the number of series-connected battery cells 2a is two, all the switching elements 111, 112, and 113 are turned off and the charging voltage for two battery cells connected in series in the battery pack 2 is set.

Next, in step 204, the microcomputer 50 determines whether the battery pack 2 is a 1P type of battery pack 2 or a 2P type of battery pack 2. If the microcomputer 50 determines that the battery pack 2 is the 1P type (step 204: YES), the microcomputer 50 outputs a low signal from the output port 51b to the charging current setting unit 70 to operationally and electrically connect the resistor 73 with the resistor 72 in parallel. The charging current $I_1$ is then set based on the divided voltage of the reference voltage Vcc with the combined resistance of the resistors 71, 72, and 73 (step 205). And, the microcomputer 50 goes to step 206. In step 206, the microcomputer 50 turns on the switching element 106 to set a charging voltage for each battery cell to 4.10 V and goes to step 209.

If the microcomputer 50 determines that the battery pack 2 is the 2P type (step 204: NO), the microcomputer 50 does not output the low signal to the charging current setting unit 70 and the resistor 73 remains without being connected to the resistor 72. The charging current $I_2$ is then set based on the divided voltage of the reference voltage Vcc with the combined resistance of the resistors 71 and 72 (step 207). Accordingly, the amount of charging current $I_2$ passing through the 2P type of battery pack 2 can be set larger than the amount of the charging current $I_1$ passing through the 1P type. And, the microcomputer 50 goes to step 208. In step 208, the microcomputer 50 turns off the switching element 106 to set the charging voltage for each battery cell to 4.15 V, which is slightly higher than the charging voltage for each battery cell in the 1P type. The microcomputer 50 then goes to step 209.

In step 209, the microcomputer 50 outputs a low signal as the start signal from the output port 51a to the photocoupler 4 to set the PWM control IC 23 in an operation state and start charging the battery pack 2. In the start of the charging, as is generally known, the microcomputer 50 charges the battery pack 2 with a constant charging current. The microcomputer 50 outputs high signals as the charging state signal from the output port 51a to the display unit 130 during charging so that the LED 131 lights up with the orange color, indicating that the battery pack 2 is in a charging process.

After the charging is started, the microcomputer 50 monitors the charging current based on the voltage inputted from the current detection unit 3 into the A/D port 52 in step 209. As the charging goes, the battery voltage increases gradually. When the battery voltage has reached a predetermined value, the microcomputer 50 changes the charging method from the constant current charging to the constant voltage charging. When the battery pack 2 is charged at the constant charging voltage, the charging current reduces gradually.

The microcomputer 50 determines whether the charging current (the voltage) has reached a predetermined current (step 210). If the charging current has reached the predetermined current (step 210: YES), the microcomputer 50 determines that the battery 2 is fully charged and outputs a high signal as the stop signal from the output port 51a to the photocoupler 4 to set the PWM control IC 23 in the stop state (step 211). After stopping the charging, the microcomputer 50 outputs a high signal as the charging state signal from the output port 51a to the display unit 130, causing the LED 131 to light up with the green color, indicating that the charging the battery pack 2 is finished.

Then, the microcomputer 50 determines whether the battery pack 2 is detached from the charging device 200 (step 212). If the battery pack 2 is detached from the charging device 1 (step 212: YES), the processing returns to step 200.

In the above embodiment, when the microcomputer 50 determines that the battery pack 2 is a 1P type, both of the charging current and the charging voltage are set less than those for a 2P type. Generally, the lifespan of the battery pack 2 depends on the charging voltage, and one battery cell in the battery pack 2 is usually charged at the charging voltage of 4.20 V. If the charging voltage per cell is set at 4.10 V less than 4.20V, the lifespan of the battery pack 2 tends to extend. Further, the allowable current of 1P type is a half of allowable current of the 2P type. Considering that the battery pack 2 is used for a cordless power tool which needs a large amount of current, the charging at the lower charging voltage can contribute to extending the lifespan of the battery pack 2, in addition to the charging with the less amount of charging current.

Alternatively, the amount of charging current $I_1$ for the 1P type can be set equal to or approximated to amount of the charging current $I_2$ for the 2P type ($I_1 \leq I_2$). The charging voltage per cell in the 1P type can be equal to the charging voltage per cell in the 2P type.

FIGS. 4, 5, and 6 shows other embodiments. FIG. 4 shows another embodiment in which the charging current for the 2P type is set as 10.0 A, which is twice as much as the charging current for the 1P type, 5.0 A. Accordingly, the charging current passing through each cell in the 1P type is the same as the charging current passing through each cell in the 2P type, and the charging voltage across each cell in the 1P type is equal to the charging voltage across each cell in the 2P type. In this case, the 1P and 2P types of battery pack 2 can have the substantially same length of the lifespan.

FIG. 5 shows further embodiment in which the charging current for the 2P type is set as 10.0 A, which is twice as much as the charging current for the 1P type, 5.0 A. Accordingly, the charging current passing through each cell in the 1P type is the same as the charging current passing through each cell in the 2P type. Further, the charging voltage to each cell in the 1P pack is set as 4.10 V, which is less than the charging voltage to each cell in the 2P pack, i.e., 4.15 V. In this case, the lifespan of the 1P pack can be extended, because the charging voltage to each cell in the 1P pack is less than the charging voltage to each cell in the 2P pack.

FIG. 6 shows further embodiment in which the charging current passing through the 1P type is set equally to the charging current passing through the 2P type, i.e., 5.0 A, and the charging voltage to each cell in the 1P type is set to 4.10 V, which is lower than the charging voltage to each cell in the 2P type, i.e., 4.15 V. In this case, the charging current passing through each cell in the 2P type is reduced to 2.5 A, which is a half of the charging current passing through each cell in the 1P type, i.e., 5.0 A. Accordingly, the lifespan of the 2P type of battery pack 2 can be extended.

As described above, in the charging device 200 according to the present invention, the proper charging current and the charging voltage for the Li-ion battery pack 2 can be changed, depending on the configuration of battery cells 2a in the battery pack 2. Accordingly, the charging device 200 can charge the battery pack 2 without affecting the length of lifespan and/or charging cycles of the battery pack 2. Additionally, the number of charging cycles for each type of battery pack can be increased.

In the above embodiment, the charging device 200 charges the 1P and 2P types. However, the charging device 200 can be applied for charging the plural-P type of battery pack (plural being equal to or more than 3).

While the invention has been described in detail with reference to the specific embodiment thereof, it would be apparent to those skilled in the art that various changes and modifications may be made therein without departing from the spirit of the invention. In the above embodiment, the battery pack 2 is made from the Li-ion secondary cells. The present invention is applicable for charging nickel-cadmium battery pack and nickel-hydride battery pack. The charging device is used for only constant-current charging method. Any mechanical or electrical identifying mechanism for identifying the configuration of the battery pack 2 can be used as the identifier 7 in addition to the battery identifying resistor 7. For example, the battery pack 2 may have a projection corresponding to a configuration of battery cells 2a in the battery pack 2. The charging device 200 has a detector for detecting the projection of the battery pack 2. If the 1P type of battery pack 2 is attached, an elastic projection formed in the battery pack accommodating portion in the charging device is retracted so that the charging device 200 detects that the 1P type of battery pack is attached. If the 2P type if battery pack 2 is attached, the elastic projection maintains projecting so that the charging device 200 detects that the 2P type of battery pack 2 is attached.

What is claimed is:

1. A charging device comprising:
   a charging unit that selectively charges a first type of battery pack and a second type of battery pack, the first type of battery pack including a first plurality of battery cells connected in a single row, the first type of battery pack having a first identifier indicating a connecting configuration of the first plurality of battery cells, and the second type of battery pack including a single battery unit or a second plurality of battery units connected in series, each battery unit including at least two battery cells connected in parallel, or a third plurality of second battery units connected in parallel, each second battery unit including at least two battery cells connected in a single row, the second type of battery pack having a second identifier indicating a connecting configuration of the single battery unit, the second plurality of battery units, or the third plurality of second battery units; and
   a control unit that detects the first identifier when the first type of battery pack is connected to the charging unit, detects the second identifier when the second type of battery pack is connected to the charging unit, and controls the charging unit to control at least one of a charging current flowing through the battery pack and a charging voltage applied across the battery pack, depending on the detected first or second identifier of the battery pack to be charged;
   wherein each of the battery cells of the first type of battery pack and the second type of battery pack is a lithium ion (Li-ion) secondary cell; and
   wherein the connecting configuration of the battery cells of the first type of battery pack differs from the connecting configuration of the second type of battery pack and the first and second identifiers indicate the connecting configuration of the different connecting configurations of the first battery pack and the second battery pack, respectively.

2. The charging device as claimed in claim 1, wherein the identifier comprises a battery identifying resistor having a resistance value corresponding to the configuration of the battery cells in the battery pack, and
   the control unit controls the at least one of the charging current or the charging voltage, depending on the resistance value of the battery identifying resistor.

3. The charging device as claimed in claim 1, wherein
   the charging unit flows a first amount of current to each battery cell of the first type of battery pack when the first type of the battery pack is charged,
      the charging unit flows a second amount of current to each battery cell of the second type of battery pack when the second type of the battery pack is charged, the control unit sets the second amount of current less than the first amount of current.

4. The charging device as claimed in claim 3, wherein the charging unit applies a first voltage across each battery cell of the first type of battery pack when the first type of the battery pack is charged, the charging unit applies a second voltage across each battery cell of the second type of battery pack when the second type of the battery pack is charged, and the control unit sets the second voltage more than the first voltage.

5. The charging device as claimed in claim 1, wherein the charging unit applies a first voltage across each battery cell of the first type of battery pack when the first type of the battery pack is charged, the charging unit applies a second voltage across each battery cell of the second type of battery pack when the second type of the battery pack is charged, and the control unit sets the first voltage less than the second voltage.

6. The charging device as claimed in claim 1, wherein
   the charging unit flows a first amount of current to each battery cell of the first type of battery pack when the first type of the battery pack is charged, the charging unit flows a second amount of current to each battery cell of the second type of battery pack when the second type of the battery pack is charged, the control unit sets the first amount of current equal to the second amount of current.

7. A charging device comprising:
   a charging unit that charges a battery pack, the battery pack being either a first type of battery pack or a second type of battery pack, the first type of battery pack including N battery cells connected in a single row, the first type of battery pack having a first identifier indicating the number N of the battery cells connected in the single row, the second type of battery pack including N first-units connected in a single row, each first-unit being M battery cells connected in parallel, or M second-units connected in parallel, each second-unit being N battery cells connected in a single row, the second type of battery pack having a second identifier indicating the number N of the units or the cells connected in series and the number M of the cells or the units connected in parallel;
   a control unit that includes a detection unit that detects one of the first and second identifiers to determine the battery pack connected to the charging device;
   a first section that sets a charging current flowing through the first type of the battery pack and a charging voltage applied across the first type of the battery pack depending on the number N of the battery cells connected in the single row when the first battery pack is connected;
   a second section that sets a charging current flowing through the second type of the battery pack and a charging voltage applied across the second type of the battery pack depending on the number N of the units connected in series and the number M of the cells connected in parallel when the second battery pack is connected; and
   a control section that controls the charging current and the charging voltage of the connected battery pack based on the set current and the set voltage.

8. The charging device as claimed in claim 7, wherein the battery cell comprises a lithium ion (Li-ion) secondary cell.

9. The charging device as claimed in claim 7, wherein the control unit sets a first amount of current flowing through each battery cell of the first type of battery pack when the first type of the battery pack is connected, and the charging unit sets a second amount of current flowing through each battery cell of the second type of battery pack when the second type of the battery pack is connected; and
   wherein the second amount of current flow through each of the cells connected in parallel is less than the first amount of current flowing through each of the cells connected in series.

10. The charging device as claimed in claim 7, wherein the control unit sets a first voltage across each battery cell of the first type of battery pack when the first type of the battery pack is connected, and the control unit sets a second voltage across each battery cell of the second type of battery pack when the second type of the battery pack is connected; and
    wherein the first voltage applied across each of the cells connected in series is less than the second voltage applied across each of the cells connected in parallel.

11. The charging device according to claim 1, wherein each of the first and second identifiers has information indicating a number of battery cells, and the control unit determines the number of battery cells in the battery pack connected to the charging unit and sets a value of the charging voltage according to the determined number of battery cells.

* * * * *